E. C. LEWIS. Improvement in Honey Boxes for Bee-Hives.
No. 120,885. Patented Nov. 14, 1871.

Witnesses:
E. Wolff
Francis McArdle

Inventor:
E. C. Lewis
Per
Attorneys.

120,885

UNITED STATES PATENT OFFICE.

ELLERY CHANNING LEWIS, OF GLASGOW, MISSOURI.

IMPROVEMENT IN HONEY-BOXES FOR BEE-HIVES.

Specification forming part of Letters Patent No. 120,885, dated November 14, 1870.

*To all whom it may concern:*

Be it known that I, ELLERY CHANNING LEWIS, of Glasgow, in the county of Howard and State of Missouri, have invented a new and useful Improvement in Hexagonal Honey-Boxes for Bee-Hives; and I do hereby declare that the following is a full, clear, and exact description thereof, which will enable others skilled in the art to make and use the same, reference being had to the accompanying drawing forming part of this specification.

Figure 1:
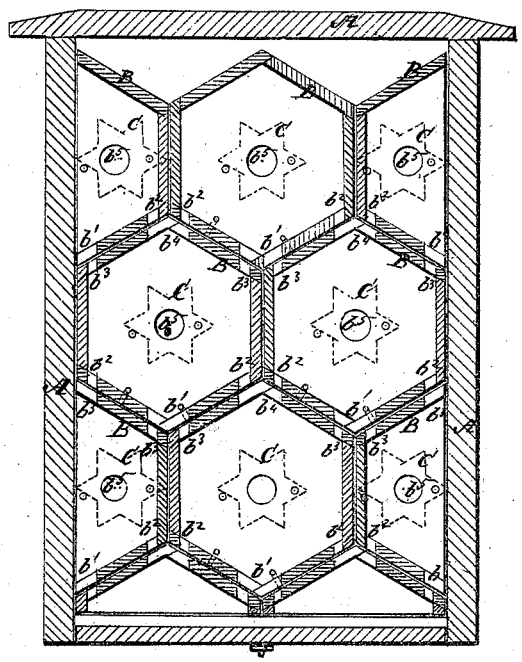
Figure 2:
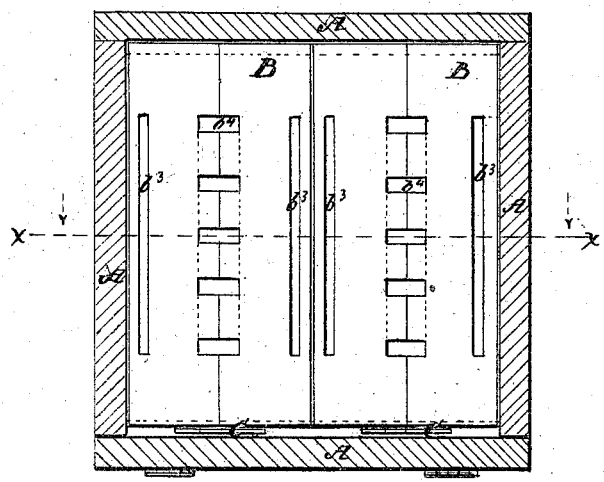
Figure 2:
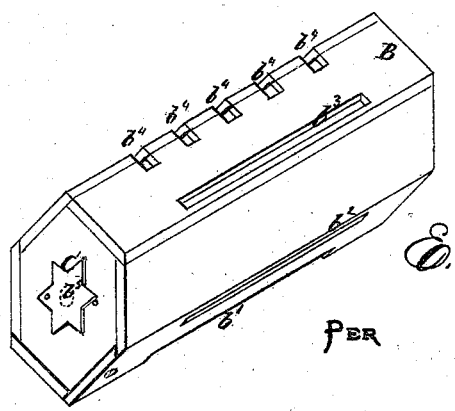

Figure 1 is a detail vertical cross-section of a series of my improved honey-boxes arranged in a cap or case, taken through the line $x$ $x$ Fig. 2. Fig. 2 is a detail top view of a tier of the said boxes. Fig. 3 is a detail perspective view of one of the boxes.

My invention has for its object to improve the construction of honey-boxes so as better to adapt them for use both in connection with the hives and in sending the honey to market; and it consists in the construction of the boxes, as hereinafter more fully described.

A represents the cap or case in which the boxes are arranged, and which is designed to be placed upon the top of a hive, or which may be a chamber in the upper part of a hive. Above a broad chamber, B, are the boxes, which are made in the form of hexagonal cylinders, as shown in Figs. 1 and 3, so that when arranged in the cap A, or for sending to market, they may fit closely and take up little space. In the lower angle of the boxes B is formed a slot, $b^1$, extending nearly to the ends of said boxes, as shown in Fig. 3. In the two lower sides of each box B, at the outer or upper edge of said sides, are formed slots $b^2$, as shown in Figs. 1 and 3. In the outer or lower edges of the two upper sides of each box B are formed slots $b^3$, as shown in Figs. 1, 2, and 3. In the upper angles of the boxes B are formed cross-slots $b^4$, of a length about equal to the width of the lowest slot $b^1$, as shown in Figs. 1, 2, and 3, which cross-slots are designed to induce the bees to build their combs across the boxes, or at right angles with their length. The slots or openings $b^3$ $b^4$ in the upper sides of the boxes B are omitted in the upper row or tier of boxes, as shown in Fig. 1. The boxes B are arranged in rows or tiers, and the spaces left vacant at the ends of every other are occupied by half-boxes, which may rest upon cleats, attached to the sides of the cap A, to support them when the boxes below them may be removed. The slots or openings $b^1$ $b^2$ $b^3$ $b^4$ enable the bees to pass freely from one box to another all through the entire series, and at the same time allow the air to circulate freely through all parts of the boxes, keeping the temperature uniform. The two lower sides of the boxes B are secured to the rear ends of the boxes by small staples or double-pointed tacks, one arm of which enters the end of the said sides and the other arm enters the side of the end of the box, so that by removing the said staples or tacks the said sides may be swung around upon their pivoting screws to obtain access to the interior of said boxes.

By this construction any box of the series may be removed without disturbing the other boxes, and replaced by a new box; or the honey may be removed and the same box put back in its place.

In the forward ends of the boxes B are formed holes $b^5$, an inch, more or less, in diameter, and which are covered by plates C, of tin or other suitable material, pivoted to the said ends, and provided with stops to hold them in position. The plates C I prefer to make in the form of stars, but they may be made of any other desired form. By turning back the plates C and inserting a hook through the hole $b^5$ the box, when loosened from the other boxes, may be conveniently drawn out. The holes $b^5$ also enable smoke to be blown into the box to drive out the bees before removing it.

Having thus described my invention, I claim as new and desire to secure by Letters Patent—

1. The hexagonal honey-boxes B, made with slots $b^1$ $b^2$ in their lower sides and with slots $b^3$ $b^4$ in their upper sides to adapt them for use in connection with each other and with a bee-hive, substantially as herein shown and described, and for the purpose set forth.

2. The hexagonal boxes B, made with their lower sides movable and secured to the ends of said boxes, substantially as herein shown and described, and for the purpose set forth.

3. The hexagonal boxes B having cross-slots $b^4$ formed in the upper angle thereof, as and for the purpose specified.

ELLERY CHANNING LEWIS.

Witnesses:
JOSEPH SOUTHWORTH,
THOMAS G. DIGGES. (9)